June 14, 1955  R. J. PIERCE  2,710,959
ULTRA SHORT RANGE ALTIMETER SYSTEM
Filed June 7, 1952  2 Sheets-Sheet 2

INVENTOR.
ROGER J. PIERCE
BY
ATTORNEY

United States Patent Office 2,710,959
Patented June 14, 1955

2,710,959

ULTRA SHORT RANGE ALTIMETER SYSTEM

Roger J. Pierce, Cedar Rapids, Iowa, assignor to Collins Radio Company, Cedar Rapids, Iowa, a corporation of Iowa Application June 7, 1952, Serial No. 292,267

7 Claims. (Cl. 343—12)

This invention relates in general to an ultra short range altimeter, and in particular to a presentation means which may be used at altitudes below 50 feet.

As aircraft landing systems have been developed for use during blind landing conditions, it has become apparent that near the ground accuracies of from 5 to 10 feet must be maintained so that the pilot will hit the runway rather than adjoining surfaces, and so that he knows when he will hit the runway. The vertical displacement must be known because the pilot flies the plane to the ground at a rather steep angle and levels out at about 5 feet above the ground until his speed is such that it is near stalling. If leveling out were not done, the impact would cause the plane to bounce or might collapse the landing gear.

It is an object of this invention, therefore, to provide an altimeter which is very accurate and which may be used by the pilot to indicate when he should start leveling out.

Another object of this invention is to provide an altimeter operable and accurate at very short distances.

Yet another object of the invention is to provide a presentation system wherein an instrument has a movable aircraft indicia mounted thereon which indicates to the pilot his position relative to the ground.

A feature of this invention is found in the provision for a high frequency transmitter that radiates energy toward the earth and which detects reflected energy and measures the phase difference between the output and input to indicate the aircraft's altitude above the surface of the earth.

Further objects, features and advantages will become apparent from the following description and claims when read in view of the drawings, in which:

Figure 1:
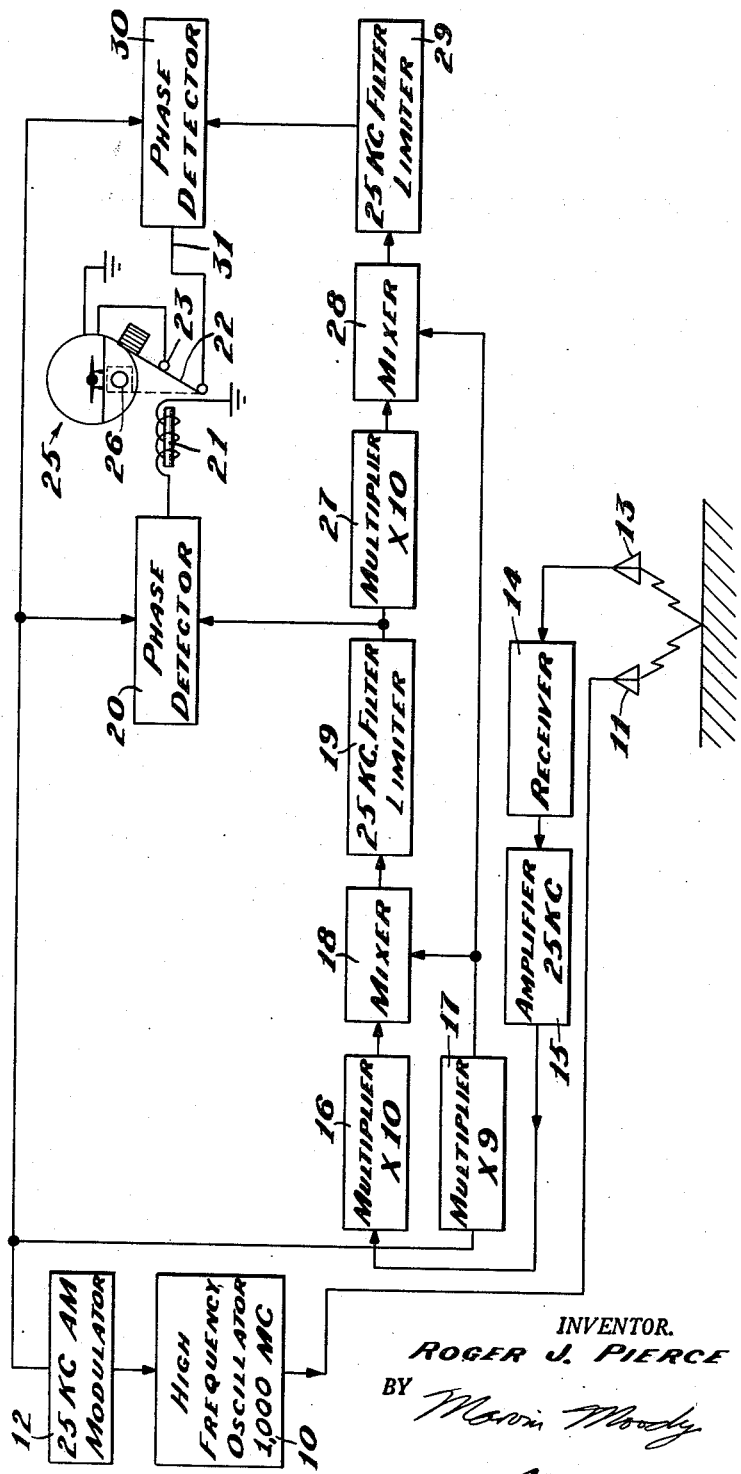
Figure 1 illustrates the altimeter of this invention.

Figure 1 shows a high frequency oscillator 10 which is connected to an output antenna 11. A modulator 12 produces an output that might be 25 kilocycles, for example, and furnishes an input to the oscillator 10 to amplitude modulate its high frequency output which might be 1000 megacycles, for example.

The antenna 11 may be mounted on the underside of an aircraft and beamed toward the ground. A receiving antenna 13 receives the reflected energy from the antenna 11 and supplies it to a receiver 14 which detects the 25 kilocycle component and supplies it to an amplifier 15.

The phase difference between the output of the amplifier 15 and the modulator 12 is an indication of the altitude of the aircraft, assuming that phase changes in the electrical circuitry are cancelled. At very low altitudes, as for example, below 100 feet, the phase angle will be so small that it cannot be detected by conventional phase detecting means.

Thus, applicant supplies the output of the amplifier 15 to a multiplier 16 which multiplies it by 10 to obtain 250 kilocycles. A second multiplier 17 receives the output of the modulator 12 and multiplies it by 9 to obtain 225 kilocycles. A mixer 18 receives inputs from the multipliers 16 and 17. A filter-limiter 19 receives the output of mixer 18 and chooses the difference component which will be equal to 25 kilocycles at a phase angle of ten times the phase angle of the output of amplifier 15. The phase angle has been increased by a factor of ten while the original frequency of 25 kilocycles has been preserved.

The output of filter-limiter 19 is connected to a phase detector 20 which also receives an input from the modulator 12. The phase detector 20 may be any one of a number of well known types and produces a direct current output proportional to the phase difference between the signal from the modulator 12 and the filter-limiter 19. A relay 21 receives the direct current output of the phase detector 20. The relay is adjusted so that it is energized at altitudes above 100 feet. When an altitude of 100 feet is reached, phase detector 20 produces a current so small that the relay 21 is deenergized and a flag 22 which has been controlled by the relay 21 is released and allowed to engage a contact 23 which actuates an airplane 24 mounted on a presentation meter 25.

When the altitude is above 100 feet, the flag 22 appears in a window 26 of the meter and the meter is disabled due to an open circuit. The purpose of phase detector 20 and relay 21 is to prevent ambiguities when the altitude is above 100 feet.

A third multiplier 27 receives an output from the filter-limiter 19 and multiplies it by ten.

A second mixer 28 receives inputs from multiplier 17 and multiplier 27. A second filter-limiter 29 receives the output of the mixer 28 and selects the difference component or 25 kilocycles. The phase angle between the output of modulator 12 and the amplifier 15 has been multiplied 100 times at the output of filter-limiter 29. This is true because the angle has been multiplied by ten twice.

A second phase detector 30 receives the output of the filter-limiter 29 and an input from the modulator 12 and gives an output proportional to the phase angle between the signals. Since the phase angle has been multiplied by 100, altitudes as small as 5 feet may be detected. Five feet will produce a signal of the same magnitude that 500 feet would without the multiplying and mixing system of the present invention.

The output of the phase detector 30 is fed by a lead 31 to the flag 22. When the relay 21 is de-energized the flag engages a contact 23 that supplies the signal to the meter 25.

While the phase angle in phase detector 20 is rotating one cycle the phase angle in phase detector 30 is rotating 10 times as much or through 10 cycles. The relay contacts on 21 are not closed until the multiplied phase angle at detector 30 is less than 360 degrees from the ground. This prevents ambiguities and assures that the meter 25 will not indicate until the proper distance from the ground is reached.

Figure 2:
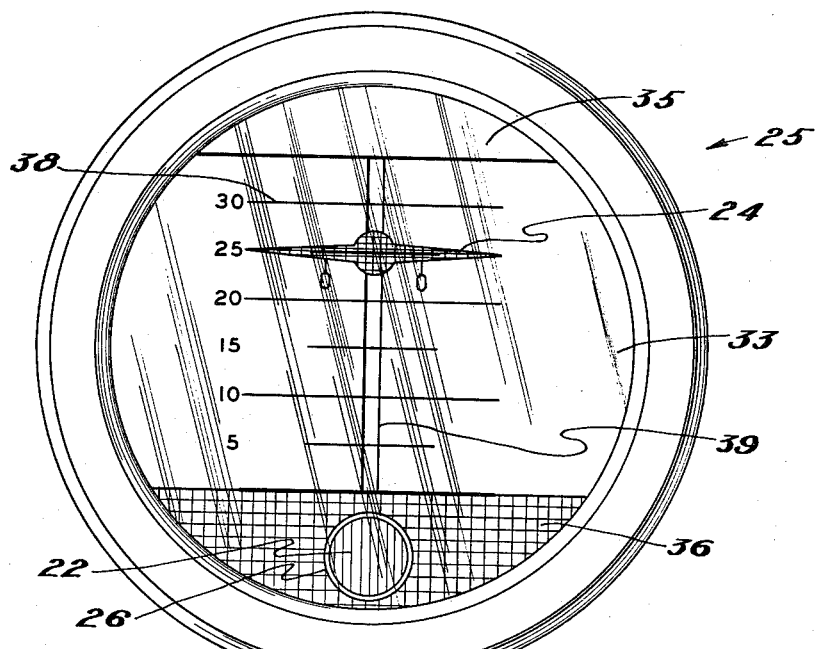
Figure 2 is a front view of the presentation instrument of the invention.
Figure 3:
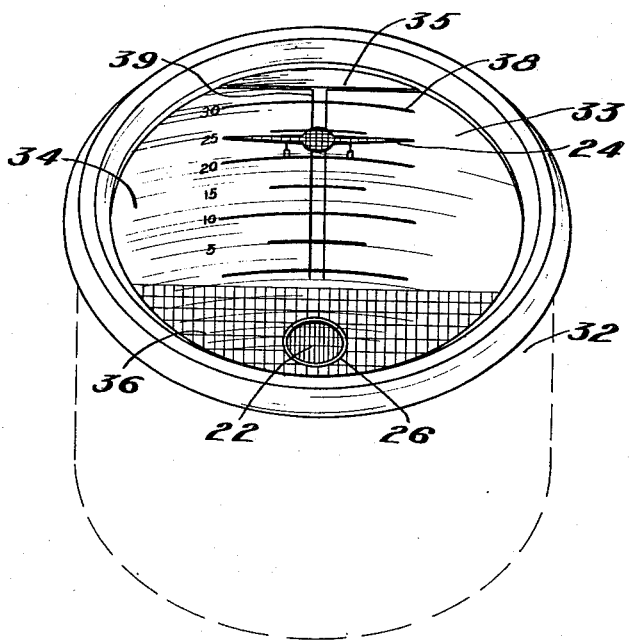
Figure 3 is a 45 degree view of the presentation instrument.

The meter 25 is shown in Figures 2 and 3 and comprises a generally cylindrical cover member 32 that has a glass face 33. An airplane indicia 24 is mounted on a pivoted arm supported toward the rear of the instrument so that the indicia 24 moves in an arc substantially vertical on the instrument. For this reason the face 34 of the instrument is slightly curved.

A blocking cover 35 is formed at the top of the instrument and at all times when the aircraft is above 50 feet, the indicia 24 remains behind this cover.

The lower part of the instrument has a blocking segment 36. The top of this segment represents the ground plane. The window 26 is formed through the segment 36 and the flag 22 may be seen therethrough. Reference lines 38 are etched on the glass 33. The arm which supports the airplane extends through a slot 39 formed in the face of the instrument.

In operation, as the aircraft approaches ground, the output of the phase detector 20 will become smaller and smaller until the relay 21 releases the flag 22 and thus closes the circuit through the contact 23 to the instrument. At approximately 50 feet, the output of the phase detector 31 will commence to move the indicia 24 as the altitude is decreased. From approximately 40 feet until the wheels contact the ground, the phase detector 31 will control the indicia 24 to an accuracy within a foot or so, and the pilot knows exactly when to level out to contact the runway.

It is to be realized, of course, that a localizer system which controls his lateral displacement relative to the runway will be simultaneously used. For example, a system according to Patent No. 2,548,278 may be used for the localizer.

By observing the position of the indicia 24, the pilot continuously knows his altitude.

Although this invention has been described with respect to particular embodiments thereof, it is not to be so limited as changes and modifications may be made therein which are within the full intended scope of the invention as defined by the appended claims.

I claim:

1. A low altitude altimeter comprising, a transmitter of radiant energy, an output antenna receiving the output of said transmitter, a receiving antenna, a receiver connected to the receiving antenna, a first multiplier receiving the output of the receiver and multiplying it by a factor of $n$, a second multiplier receiving the output of said transmitter and multiplying it by a factor of $n-1$, a first mixer receiving the outputs of the first and second multipliers, a first filter receiving the output of the first mixer and passing the difference frequency, a phase detector receiving the output of said filter and an output from said transmitter to produce a signal proportional to altitude.

2. A low altitude altimeter comprising, a transmitter, a transmitting antenna receiving the output of said transmitter, a receiving antenna, a receiver receiving an input from said receiving antenna, a first multiplier receiving an input from said receiver and multiplying it by a factor of $n$, a second mulitplier receiving an input from said transmitter and multiplying it by a factor of $n-1$, a mixer receiving the outputs of said first and second multipliers, a filter receiving the output of said mixer and passing the difference frequency, and a phase detector receiving the output of said filter and an input from said transmitter to produce a signal proportional to altitude.

3. A low altitude altimeter for an aircraft comprising, an oscillator mounted on said aircraft, a first antenna receiving the output of said oscillator and beaming it toward the ground, a second antenna mounted on said aircraft and receiving the reflected energy from the ground, a receiver carried on said aircraft and receiving the input of said second antenna, a first multiplier receiving the output of said receiver and multiplying it by a factor of $n$, a second multiplier receiving the output of said transmitter and multiplying it by a factor of $n-1$, a first mixer receiving the outputs of the first and second multipliers, a first filter receiving the output of the first mixer and passing the difference frequency, a first phase detector receiving an input from said transmitter and an input from said first filter, a relay receiving the output of said first phase detector, a presentation meter, a flag pivotally supported on said presentation meter and controlled by said relay, a third multiplier receiving an output of said first filter and multiplying it by a factor $n$, a second mixer receiving an input from said third multiplier and an input from said second multiplier, a second filter receiving the output of said second mixer and passing the difference frequency, a second phase detector receiving an input from said second filter and an input from said transmitter, the output of said second phase detector connected to said flag, and said flag connected to said presentation meter when said relay is de-energized.

4. A low altitude altimeter for an aircraft comprising, a high frequency oscillator mounted on said aircraft, a modulator amplitude modulating said high frequency oscillator with a frequency of $f_1$, a radiating antenna receiving the output of said high frequency oscillator and beaming it toward the ground, a receiving antenna receiving the reflected energy, a receiver receiving an input from said receiving antenna and detecting the frequency $f_1$, a first multiplier receiving the output of said receiver and multiplying it by a factor of $n$, a second multiplier receiving an input from said modulator and multiplying it by a factor of $n-1$, a first mixer receiving inputs from the first and second multipliers, a first filter receiving the output of the first mixer and passing the frequency $f_1$, a first phase detector receiving an input from the modulator and an input from said first filter, a relay connected to said first phase detector, a third multiplier receiving the output of the first filter and multiplying it by a factor of $n$, a second mixer receiving inputs from the second and third multipliers, a second filter receiving the output of the second mixer and passing the frequency $f_1$, a second phase detector receiving inputs from said modulator and said second filter, a presentation meter with a movable indicia, a flag pivotally supported on said presentation instrument and controlled by said relay, said flag connected to the output of said second phase detector, an electrical contact engaged by said flag when the relay is de-energized, and said electrical contact connected to said presentation instrument to cause the indicia to move when the flag engages said contact.

5. A low altitude altimeter comprising, a transmitter, a radiating antenna receiving the output of said transmitter, a receiving antenna receiving the reflected energy, a receiver connected to said receiving antenna, a pair of multipliers connected, respectively, to the outputs of said transmitter and said receiver, said multipliers having multiplying factors of $n$ and $n-1$, respectively, a first mixer receiving the outputs of said first pair of multipliers, a filter receiving the output of said first mixer and passing the difference frequency, a first phase detector receiving an output from said transmitter and an output from said first filter, a third multiplier receiving the output of said first filter, a second mixer receiving inputs from said third multiplier and one of said pair of multipliers, a second filter receiving the output of the second mixer, a second phase detector receiving an input from said transmitter and an input from said second filter, disabling means connected to said first phase detector, a presentation instrument connected to said disabling means, and an indicating means connected to said second phase detector when said disabling means is de-energized.

6. Means for measuring small phase differences between a pair of signals comprising, a first multiplier receiving the first signal and multiplying it by a factor of $n$, a second multiplier receiving the second signal and multiplying it by a factor of $n-1$, a mixer receiving the outputs of the first and second multipliers, a filter receiving the output of the mixer and passing the difference frequency, and a phase detector receiving the output of the filter and the second signal to produce an output proportional to $n$ times the phase difference between the two signals.

7. Means for measuring small phase angles between a pair of input signals comprising, a first multiplier receiving one of said input signals and multiplying it by a factor of $n$, a second multiplier receiving the second input signal and multiplying it by a factor of $n-1$, a mixer receiving the outputs of the first and second multipliers, a filter receiving the output of the mixer and having a center frequency equal to the frequency of the first and second input signals, a phase detector receiving the output of the filter and the second input signal and producing an output proportional to $n$ times the phase difference between the first and second signals.

References Cited in the file of this patent

UNITED STATES PATENTS

| | | |
|---|---|---|
| 2,198,113 | Holmes | Apr. 23, 1940 |
| 2,268,587 | Guanella | Jan. 6, 1942 |
| 2,403,527 | Hershberger | July 9, 1946 |
| 2,467,412 | Wathen | Apr. 19, 1949 |